US012706109B2

(12) United States Patent
Liu et al.

(10) Patent No.: US 12,706,109 B2
(45) Date of Patent: Aug. 11, 2026

(54) METHOD AND APPARATUS FOR PROCESSING AUDIO DATA, DEVICE, STORAGE MEDIUM

(71) Applicant: TENCENT TECHNOLOGY (SHENZHEN) COMPANY LIMITED, Shenzhen (CN)

(72) Inventors: Qiunan Liu, Shenzhen (CN); Fei Huang, Shenzhen (CN); Hao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 234 days.

(21) Appl. No.: 18/502,581

(22) Filed: Nov. 6, 2023

(65) Prior Publication Data

US 2024/0071402 A1 Feb. 29, 2024

Related U.S. Application Data

(63) Continuation of application No. PCT/CN2022/125091, filed on Oct. 13, 2022.

(30) Foreign Application Priority Data

Dec. 1, 2021 (CN) ......................... 202111456334.6

(51) Int. Cl.
*G10L 21/02* (2013.01)
*G10L 21/0208* (2013.01)

(52) U.S. Cl.
CPC ..................... *G10L 21/0208* (2013.01); *G10L 2021/02082* (2013.01)

(58) Field of Classification Search
CPC ....... G10L 21/0208; G10L 2021/02082; G10L 15/20; G10L 25/84
USPC .......................................................... 704/226
See application file for complete search history.

(56) References Cited

U.S. PATENT DOCUMENTS

| | | | | |
|---|---|---|---|---|
| 2019/0206415 | A1* | 7/2019 | Song | G10L 25/84 |
| 2021/0183377 | A1* | 6/2021 | Cho | G10L 15/20 |
| 2021/0306782 | A1 | 9/2021 | Klinke et al. | |

FOREIGN PATENT DOCUMENTS

| | | | |
|---|---|---|---|
| CN | 106384588 | A | 2/2017 |
| CN | 106997766 | A | 8/2017 |
| CN | 108022591 | A | 5/2018 |
| CN | 111540346 | A | 8/2020 |
| CN | 113299306 | A | 8/2021 |
| CN | 114242097 | A | 3/2022 |

OTHER PUBLICATIONS

International Search Report for PCT/CN2022/125091, dated Dec. 20, 2022.

(Continued)

*Primary Examiner* — Md S Elahee
(74) *Attorney, Agent, or Firm* — Sughrue Mion, PLLC

(57) ABSTRACT

A method for noise reduction and echo cancellation includes obtaining original audio data, the original audio data including pure speech audio data and noise audio data, generating simulated noisy data based on the pure speech audio data and the noise audio data, and generating target audio data based on the simulated noisy data, the target audio data being used for simulating changes in the original audio data after spatial transmission.

20 Claims, 5 Drawing Sheets

(56) References Cited

OTHER PUBLICATIONS

Written Opinion for PCT/CN2022/125091, dated Dec. 20, 2022.
Translation of Written Opinion for PCT/CN2022/125091, dated Dec. 20, 2022.

* cited by examiner

METHOD AND APPARATUS FOR PROCESSING AUDIO DATA, DEVICE, STORAGE MEDIUM

CROSS-REFERENCE TO RELATED APPLICATIONS

This application is a continuation application of International Application No. PCT/CN2022/125091, filed on Oct. 13, 2022, which claims priority to Chinese Patent Application No. 202111456334.6, filed on Dec. 1, 2021, the disclosures of which are incorporated by reference herein in their entireties.

FIELD

This application relates to the technical field of speech signal processing, and in particular to audio data processing.

BACKGROUND

With the continuous development of a speech signal processing technology and an artificial intelligence (AI) technology, there are more and more tasks to process a speech through AI, such as AI speech noise reduction and echo cancellation. In a processing process, it is necessary to collect a large quantity of various noise audio that can be used for training, as well as audio data such as echo audio for various special scenarios, which often consumes a lot of manpower and financial resources. In AI speech processing, if there is a lack of sufficient quantity or type of training data, overfitting, poor recognition effect and other problems arise.

SUMMARY

It is an aspect to provide a method and apparatus for processing audio data, a device, a storage medium and a program product, and the diversity of simulated audio data synthesizing method is improved.

According to an aspect of one or more embodiments, there is provided a method. The method includes obtaining original audio data, the original audio data including pure speech audio data and noise audio data; generating simulated noisy data based on the pure speech audio data and the noise audio data; and generating target audio data based on the simulated noisy data, the target audio data being used for simulating changes in the original audio data after spatial transmission.

According to other aspects of one or more example embodiments, there is also provided an apparatus and a computer-readable storage medium consistent with the method

DETAILED DESCRIPTION

Figure 1:
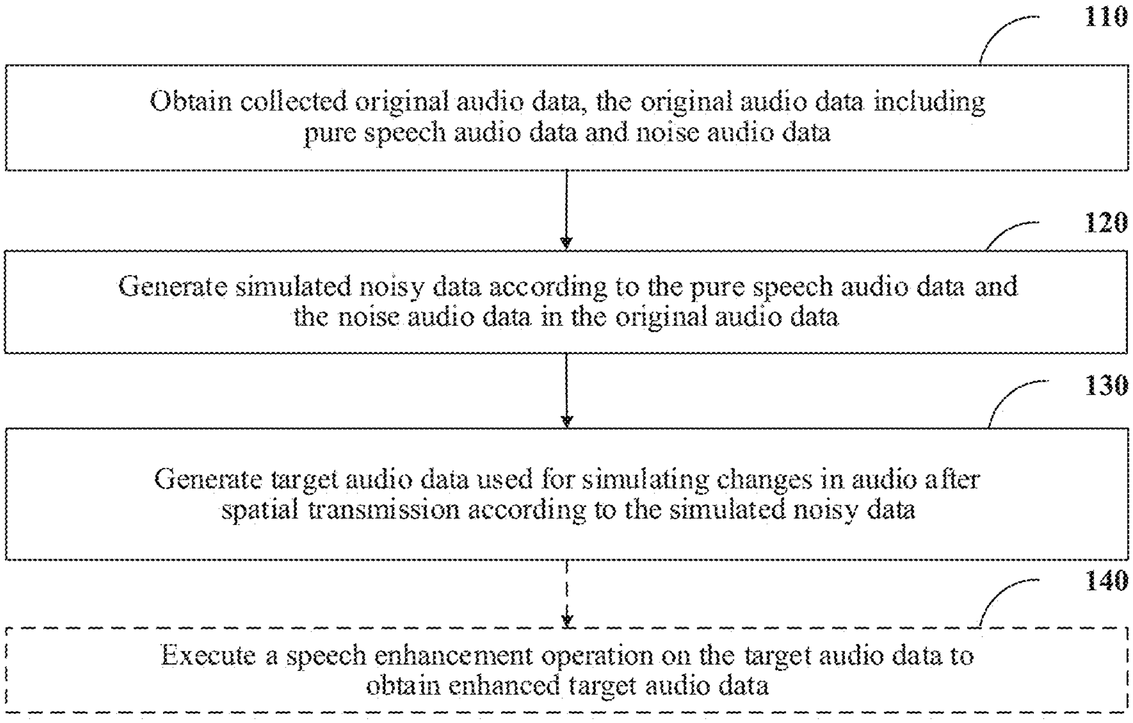
FIG. 1 is a schematic flowchart of a method for processing audio data provided by an embodiment of this application.

The technical methods in embodiments of this application are clearly and completely described in the following with reference to accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

According to some embodiments, collected original audio data is obtained, including the pure speech audio data and the noise audio data; simulated noisy data is generated according to the pure speech audio data and the noise audio data in the original audio data; and target audio data used for simulating changes in audio after spatial transmission is generated according to the simulated noisy data. A large quantity of easily available clean human voice audio and a variety of noise audio are adopted, changes of speech in a spatial propagation path are described through a mathematical language, and various simulated target audio data is synthesized. Compared to manual collection of audio data in the related technology, where a large quantity of manpower and resources may be consumed, in this application, the original audio data which is easily collected is used for audio data processing, changes of audio through various spatial transmission are simulated to automatically generate diversified target audio data in batches, and a more comprehensive simulated audio data synthesizing method is generated.

Embodiments of this application provide a method for processing audio data, an apparatus for processing audio data, a medium and a device. Specifically, the method of this embodiment of this application may be executed by a computer device, and the computer device may be a terminal, a server or the like. This embodiment of this application may be applied to the research of artificial intelligence (AI) noise reduction and artificial intelligence (AI) echo cancellation technologies in artificial intelligence and machine learning, and meanwhile, may also serve as an auxiliary method for improving data diversity in a research process of speech recognition, speaker recognition and other technologies.

First, some nouns or terms appearing in a process of describing this embodiment of this application are explained as follows:

artificial intelligence (AI): AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, so as to enable the machines to have the functions of perception, reasoning, and decision-making. An AI speech model in this application processes speech audio through an AI machine learning model to obtain a corresponding analysis result, such as AI speech noise reduction and echo cancellation operations.

Signal-to-noise ratio (SNR): representing an amplitude ratio of a useful signal to a noise signal.

Perceptual evaluation of speech quality (PESQ): the perceptual evaluation of speech quality is an objective and fully referenced speech quality evaluation method. Its algorithm needs a noisy attenuated signal and an original reference signal, which can provide a subjective prediction value for objective speech quality evaluation, the score is between −0.5 and 4.5, and the higher the score, the better the speech quality.

Blockchain system: it may be a distributed system formed by connecting a client and a plurality of nodes (any form of computing devices in an access network, such as servers and user terminals) through network communication. A peer-to-peer (P2P) network is formed between the nodes, a P2P protocol is an application-layer protocol running over a transmission control protocol (TCP), in the distributed system, any machine, such as a server and a terminal may join and become a node, and the nodes include a hardware layer, an intermediate layer, an operating system layer and an application layer.

The rise of a data-driven AI algorithm and widespread productization applications have brought great convenience to our lives. The data-driven AI algorithm is to make a model have an ability to understand data and learn knowledge from historical data to predict unknown data. Therefore, in order to fabricate an AI model with an extremely high generalization ability, machines need to be knowledgeable and accumulate sufficient wealth of data.

Constructing an audio database needed by AI speech model training needs a high cost in practice. For example, when the AI speech model is used for processing audio, such as training of AI speech recognition, or in practical applications, a large quantity of audio data that may be used for training is needed. At present, there is a universal basic audio database, but the diversity of universal data is not sufficient to meet various business needs, often requiring manual collection of a large quantity of audio data that may be used for training, including various noise audio, echo audio and various special application scenarios. However, such collection needs a large quantity of manpower, financial resources and material resources.

In another type of technology, an audio data amplification method for speech recognition is provided. An amplification strategy includes using function sparse image warping to apply time warping, randomly selecting audio frequency domain channels for shielding, and randomly selecting audio time domain channels for shielding. However, in certain special application scenarios, more diverse databases are still needed.

From the embryonic development of the AI speech technology to this day, a complete industrial chain, including upstream, midstream and downstream, has been formed. The downstream industry of an intelligent speech technology has diversified applications and a wide demand for one-stop services. Consumer level application fields currently include, but not limited to: chat apps, smart hardware, smart homes, vehicle-mounted systems and the like. This application-discloses a method for processing audio data for technical fields that require various audio data, such as AI speech model training, which may be applied to the research of artificial intelligence (AI) noise reduction and artificial intelligence (AI) echo cancellation technologies in artificial intelligence and machine learning, and meanwhile, may also serve as an auxiliary method for improving data diversity in a research process of speech recognition, speaker recognition and other technologies, a relative complete method for processing the audio data is provided, and the diversity of an audio dataset is effectively improved.

To better understand the technical methods provided by the embodiments of this application, the following is a brief introduction to an application scenario to which the technical methods provided by the embodiments of this application are applicable, and the application scenario introduced below is merely for the purpose of explaining the embodiments of this application, and not limiting them. In an embodiment, the method for processing audio data is executed by a computer device is taken as an example, and the computer device may be a terminal device or a server. The server may be an independent physical server, or may be a server cluster or distributed system composed of a plurality of physical servers, or may be a cloud server that provides cloud computing services. The terminal device includes, but not limited to a mobile phone, a computer, an intelligent speech interaction device, intelligent household electrical appliance, a vehicle-mounted terminal, an aircraft and the like. The terminal device and the server may be connected directly or indirectly in a wired or wireless communication mode, which is not limited in this application here.

This embodiment of this application may be implemented in combination with a cloud technology or a blockchain network technology. For example, in the method for processing audio data disclosed in this embodiment of this application, these data may be saved in a blockchain. For example, original audio data, pure speech audio data, noise audio data, simulated noisy data, target audio data and enhanced target audio data may all be saved on the blockchain.

In order to facilitate the storage and query of the original audio data, the pure speech audio data, the noise audio data, the simulated noisy data, the target audio data and the enhanced target audio data, in some embodiments, the method for processing audio data further includes: the original audio data, the pure speech audio data, the noise audio data, the simulated noisy data, the target audio data and the enhanced target audio data are sent into a blockchain network, such that nodes of the blockchain network fill a new block with the original audio data, the pure speech audio data, the noise audio data, the simulated noisy data, the target audio data and the enhanced target audio data, and when consensus is reached on the new block, the new block is added to the end of the blockchain. This embodiment of this application may store the original audio data, the pure speech audio data, the noise audio data, the simulated noisy data, the target audio data and the enhanced target audio data on the chain, realizing record backup. When the target audio data and the enhanced target audio data need to be obtained, the corresponding target audio data and enhanced target audio data may be directly and quickly obtained from the blockchain, so that the efficiency of audio data processing is improved.

Detailed descriptions are separately provided below. The description order of the following embodiments does not limit the priority order of the embodiments.

Each embodiment of this application provides a method for processing audio data, and this embodiment provides that the method for processing audio data is executed by a computer device.

Please refer to FIG. 1, and FIG. 1 is a schematic flowchart of a method for processing audio data provided by an embodiment of this application. The method includes:

Operation 110: Obtain collected original audio data, the original audio data including pure speech audio data and noise audio data.

Specifically, the original audio data at least includes the pure speech audio data and the noise audio data the, and may further include a room impulse response.

The pure speech audio data includes pure voice audio data. There is no limit to types of data, which may include a plurality of languages, a plurality of dialects, vocal humming music and the like. The pure voice audio data may be collected in advance through various methods, including a common audio database, a proprietary audio database or manual collection. For example, a large quantity of clean vocal audio from real scenarios.

The noise audio data includes various noise audio data, such as a large quantity of pure subway noise, traffic noise, natural background noise, vehicle-mounted noise, indoor and outdoor noise and other noise in various common scenarios. The noise audio data may be collected in advance through various methods, including obtaining from a common audio database and a proprietary audio database, or manual collection.

Operation 120: Generate simulated noisy data according to the pure speech audio data and the noise audio data in the original audio data.

Specifically, after obtaining the pure speech audio data and the noise audio data, for example, the clean voice audio data may be added into the noise audio data to synthesize a new piece of simulated noisy audio, so that a large quantity of simulated noisy data may be synthesized by mixing the pure speech audio data and various noise audio data. The simulated noisy data contains a speech signal and a background noise signal thereof. In natural life, a large quantity of audio data is the noisy audio data including the speech signals and the background noise signals. In practical applications of audio, such as the application of an AI echo cancellation model, the input of a far-end microphone is human voice and background noise, and the input of the far-end microphone and a near-end microphone may be simulated by synthesizing the simulated noisy data.

A synthesizing method for mixing the pure speech audio data and the various noise audio data may be implemented according to a signal-to-noise ratio (SNR), noisy data is synthesized according to the audio signal-to-noise ratio, and the audio signal-to-noise ratio is a ratio of normal voice signal strength to noise signal strength. For example:

a signal-to-noise ratio calculating method may be represented as a formula (1):

$$SNR(s(t),\ n(t)) = 10\cdot\log_{10}\frac{\sum_t s^2(t)}{\sum_t n^2(t)}; \quad (1)$$

where, SNR represents the signal-to-noise ratio with a unit of dB, s(t) represents the pure speech audio data, $\Sigma_t s^2(t)$ represents speech energy of the pure speech audio data, n(t) represents the noise audio data, and $\Sigma_t s^2 t)$ represents noise energy of the noise audio data.

When the pure speech audio data is synthesized with the various noise audio data, the noise energy may be adjusted, that is, the noise energy is adjusted to α times the original, namely αn(t), and then the signal-to-noise ratio is represented as a formula (2):

$$q = 10\cdot\log_{10}\frac{\sum_t s^2(t)}{\alpha^2\sum_t n^2(t)}; \quad (2)$$

where, q represents a signal-to-noise ratio (SNR) when adjusting the noise energy ratio.

Therefore, a calculating formula of a noise energy adjusting ratio α may be represented as a formula (3):

$$\alpha = \sqrt{\frac{\sum_t s^2(t)}{10^{\frac{q}{10}}\sum_t n^2(t)}}. \quad (3)$$

When the pure speech audio data is synthesized with the various noise audio data, by giving a preset signal-to-noise ratio (SNR), namely q in the formula (3), in some embodiments, the signal-to-noise ratio q may be randomly selected as an integer within a range of (−5, 20). Then the noise energy adjusting ratio α may be obtained through the formula (3), and then the pure speech audio data s(t) is synthesized with the noise audio data n(t) to generate the simulated noisy audio data, which may be represented as a formula (4):

$$\text{mix}(t)=s(t)+\alpha n(t) \quad (4).$$

In some embodiments, the operation of generating the simulated noisy data according to the pure speech audio data and the noise audio data in the original audio data further includes:

multiplicative noise audio data in the noise audio data is transformed into additive noise audio data through homomorphic filtering processing; and the pure speech audio data and the additive noise audio data are synthesized according to the signal-to-noise ratio to obtain the simulated noisy audio data.

Specifically, the collected noise audio data may be additive noise or multiplicative noise. The additive noise and the multiplicative noise are two noise types which are widely used. The additive noise includes thermal noise, shot noise and the like, a relationship between the additive noise and the signal is additive, and the additive noise exists regardless of whether there is a signal or not. The multiplicative noise is generally caused by imperfect channels, a relationship between the multiplicative noise and the signal is multiplicative, and the signal and the multiplicative noise coexist. The additive noise may be used for simulating the background noise, and the multiplicative noise may be used for simulating time-varying or nonlinear systems.

It may be understood that the additive noise, in terms of its interference with speech, is the addition of two signals in a time domain, or a superposition relationship between the background noise and the speech in terms of sound strength from an energy perspective, and the two jointly act on a microphone to form the noisy speech signal.

The multiplicative noise audio data refers to a convolutional relationship between the noise and the speech in the time domain, and a multiplicative relationship between the noise and the speech in a frequency domain. The multiplicative noise audio data may be converted to be additive through transformation, for example, the multiplicative noise audio data or convolution audio data may be transformed into the additive noise audio data through homomorphic filtering.

The transforming into the additive noise audio data through homomorphic filtering may include the following operations:

first, the multiplicative noise audio data may be represented in the time domain as:

$$x(t)=x_1(t)*x_2(t) \quad (5);$$

where, x(t) represents the multiplicative noise audio data, $x_1(t)$ is speech in the multiplicative noise audio data, and $x_2(t)$ is noise in the multiplicative noise audio data.

Z transformation is performed on the formula (5) to convert a convolutional signal into a multiplicative signal, specifically as shown in a formula (6):

$$Z[x(t)]=X(z)=X_1(z)*X_2(z) \quad (6).$$

Then a logarithmic operation is performed on two sides of the formula (6) to convert a multiplication operation into an addition operation, specifically as shown in a formula (7):

$$\ln X(z)=\ln X_1(z)+\ln X_2(z)=\hat{X}_1(z)+\hat{X}_2(z)=\hat{X}(z) \quad (7).$$

The inverse-Z transformation is performed on $\hat{X}(z)$ to convert a logarithmic z-domain signal into a time-domain signal, specifically shown in a formula (8):

$$Z^{-1}[\hat{X}(z)]=Z^{-1}[\hat{X}_1(z)+\hat{X}_2(z)]=\hat{x}_1(t)+\hat{x}_1(t)=\hat{x}(t) \quad (8).$$

In this way, the multiplicative noise audio data x(n) is transformed into the additive noise audio data $\hat{x}(t)$.

Further, the pure speech audio data is synthesized with the additive noise audio data according to the signal-to-noise ratio to obtain the simulated noisy data.

A specific synthesizing method may perform synthesis through the above formulas (1) to (4). That is, after giving a preset signal-to-noise ratio (SNR), the specific simulated noisy audio data is synthesized through the above formulas (1) to (4).

Therefore, by transforming the multiplicative noise audio data into the additive noise audio data, and then synthesizing the simulated noisy audio data, the background noise in a natural scenario may be better simulated, and the simulation performance of the simulated noise audio data is improved.

Operation 130: Generate the target audio data used for simulating changes in audio after spatial transmission according to the simulated noisy data.

Specifically, a mathematical language may be used for describing the changes in audio data during spatial transmission. The changes of spatial transmission may include changes through loudspeaker transmission or changes through a near-end loudspeaker and a microphone. Correspondingly, the target audio data may include reverberation audio data, echoic audio data or the like.

In a possible implementation, the target audio data used for simulating the changes in audio after spatial transmission may further be generated according to the original audio data.

Since the original audio data includes the pure speech audio data and the noise audio data, compared to the target audio data generated through the simulated noisy data, more diversified target audio data may be generated, and the diversified target audio data may be more conducive to subsequent model training and improving the generalization of the model.

In some embodiments, the target audio data includes the reverberation audio data, and operation 130 includes:

operation 1301: Generate simulated loudspeaker audio used for simulating changes in audio passing through a loudspeaker according to the simulated noisy data, as well as at least one of the pure speech audio data and the noise audio data; and operation 1302: Generate the reverberation audio data according to the simulated loudspeaker audio and a room impulse response.

In some embodiments, operation 1301 includes:

processing the simulated noisy data, the pure speech audio data and the noise audio data as a loudspeaker input signal to obtain an audio signal maximum value;

generating loudspeaker power amplifier audio used for simulating changes in audio passing through a power amplifier saturation zone in the loudspeaker according to the audio signal maximum value and the loudspeaker input signal;

performing first nonlinear conversion on the loudspeaker power amplifier audio to obtain nonlinear loudspeaker power amplifier audio; and processing the nonlinear loudspeaker power amplifier audio by using a nonlinear action function to generate the simulated loudspeaker audio.

Specifically, the simulated noisy data, the pure speech audio data and the noise audio data are processed as the loudspeaker input signal x(t) to obtain the audio signal maximum value $x_{max}$. In some embodiments, $x_{max}$ may further be set as a ratio of an input signal maximum value, such as 80% of the maximum value.

Further, the loudspeaker power amplifier audio used for simulating changes in audio passing through the power amplifier saturation zone in the loudspeaker is generated according to the audio signal maximum value and the loudspeaker input signal. Specifically, the loudspeaker input signal may be the simulated noisy data, the pure speech audio data or the noise audio data. For example, the simulated noisy data may be synthesized through the above formulas (1) to (8) according to the simulated noisy data, and the simulated noisy data may be represented as:

$$x(t)=s(t)+\alpha n(t) \quad (9);$$

where, s(t) represents the pure speech audio data, n(t) represents the noise audio data, and α represents a noise energy adjusting ratio.

For the loudspeaker input signal x(t), the changes in audio passing through the power amplifier saturation zone in the loudspeaker may be simulated through a formula (10):

$$\hat{x}(t)=\text{Clip}_{soft}(x(t))=\frac{x_{max}x(t)}{\sqrt{|x_{max}|^2+|x(t)|^2}}; \quad (10)$$

where, x(t) represents the loudspeaker input signal, $x_{max}$ represents a maximum value of an input speech signal x(t), and $\hat{x}(t)$ represents the loudspeaker power amplifier audio that changes after passing through the power amplifier saturation zone in the loudspeaker.

In some embodiments, the loudspeaker power amplifier audio may also be generated according to the pure speech audio data, and then x(t) in the formula (10) is the pure speech audio data s(t) in the formula (9).

In some embodiments, the loudspeaker power amplifier audio may also be generated according to the noise audio data, and then x(t) in the formula (10) is the noise audio data n(t) in the formula (9).

Further, the first nonlinear conversion is performed on the loudspeaker power amplifier audio to obtain the nonlinear loudspeaker power amplifier audio. The first nonlinear conversion may be represented as a formula (11):

$$b(\hat{x}(t)) = \frac{3}{2}\hat{x}(t) - \frac{3}{10}\hat{x}^2(t); \quad (11)$$

where, x(t) represents the loudspeaker input signal.

Further, the nonlinear loudspeaker power amplifier audio is processed by using the nonlinear action function to generate the simulated loudspeaker audio.

Specifically, A nonlinear characteristic of the loudspeaker may be described by using the mathematical language through the nonlinear action function, namely sigmoid function, which may be represented as formulas (12) to (13):

$$\hat{y}(t) = NL(\hat{x}(t)) = \frac{1}{1 + e^{[-a \cdot b(\hat{x}(t))]}} - \frac{1}{2}; \quad (12)$$

$$a = \begin{cases} 4 & \text{if } b(\hat{x}(t)) > 0 \\ 2 & \text{if } b(\hat{x}(t))) \leq 0 \end{cases}; \quad (13)$$

where, $\hat{x}(t)$ represents the simulated loudspeaker audio data, a is a nonlinear parameter, when $b(\hat{x}(t))>0$, a may be taken as 4, and when $b(\hat{x}(t)))\leq 0$, a may be taken as 2; and $\hat{y}(t)$ represents simulated loudspeaker audio after distortion changes in the nonlinear characteristic of the loudspeaker.

In this way, a distortion phenomenon that occurs when speech passes through the power amplifier saturation zone in the loudspeaker and the nonlinear changes that occur in the transmission process may be simulated through the above formulas (10) to (13). The situation that the changes in speech after spatial transmission of the loudspeaker are described through a mathematical form is realized, so that the simulated loudspeaker audio may be obtained, and the simulated loudspeaker audio may be stored as independent simulated audio data, and may be applied to scenarios that simulate loudspeaker audio.

After obtaining the simulated loudspeaker audio, the reverberation audio data may be generated according to the simulated loudspeaker audio and the room impulse response.

The room impulse response (RIR) may use methods such as a minor sound source model to realize a specific needed RIR signal.

Specifically, convolution is performed on the simulated loudspeaker audio $\hat{y}(t)$ broadcast by the loudspeaker and a randomly selected room impulse response signal RIR(t) to generate reverberant signal d(t), which may be synthesized by using a well-known convolution formula, as shown in a formula (14):

$$d(t) = \hat{y}(t) * RIR[t] = \sum_{k=-\infty}^{+\infty} \hat{y}[k]RIR[t-k]. \quad (14)$$

In this way, the simulated loudspeaker audio generated by describing the changes in the speech after spatial transmission of the loudspeaker is described through the mathematical form, and then convolution is performed on the simulated loudspeaker audio and the specific room impulse response, so as to simulate the synthesis of the reverberation audio data.

Figure 2:
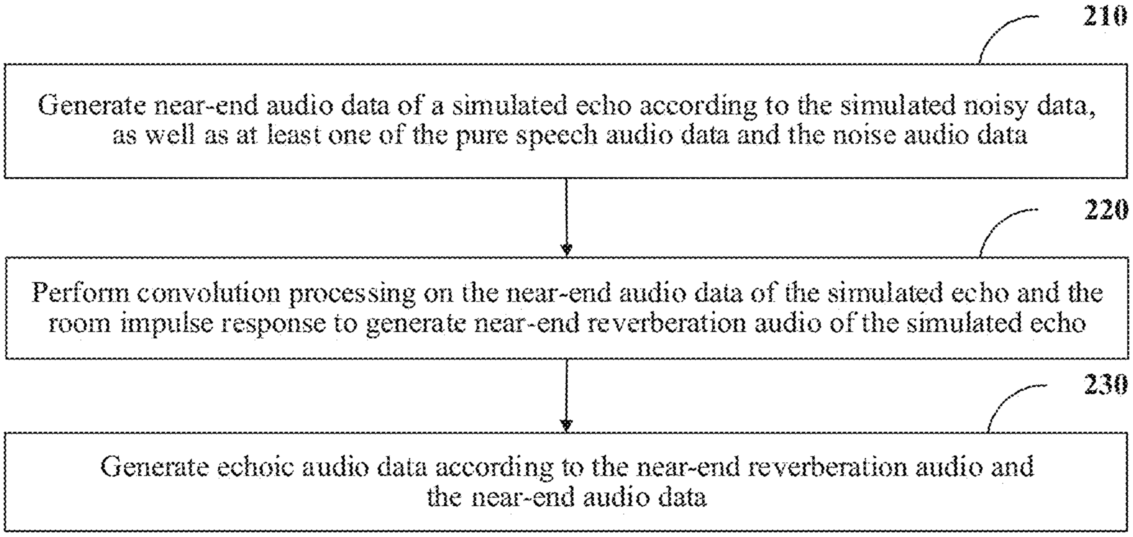
FIG. 2 is another schematic flowchart of a method for processing audio data provided by an embodiment of this application.

In some embodiments, with reference to FIG. 2, the target audio data includes the echoic audio data, and operation 130: generating the target audio data used for simulating changes in audio after spatial transmission according to the simulated noisy data, includes:

operation 210: Generate near-end audio data of a simulated echo according to the simulated noisy data, as well as at least one of the pure speech audio data and the noise audio data.

Figure 3:
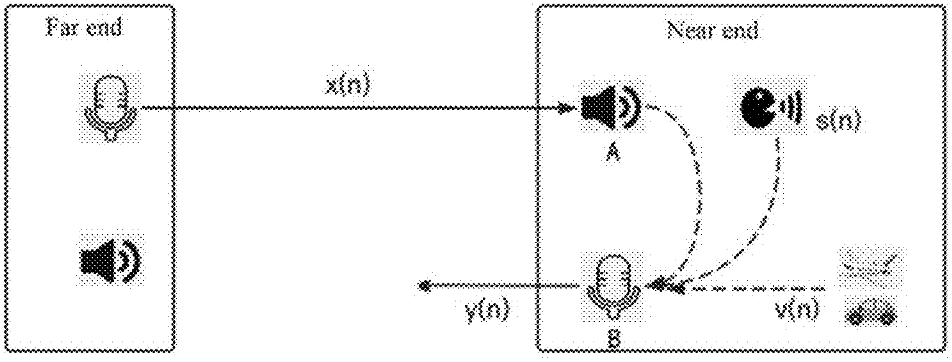
FIG. 3 is an example diagram of a method for processing audio data provided by an embodiment of this application.

Please refer to FIG. 3. FIG. 3 is a schematic diagram of generation of echoic audio data, the voice x(n) of a remote speaker is broadcast from a near-end loudspeaker A through communication transmission, after being broadcast by the near-end loudspeaker A, the audio is transmitted through near-end environment to be recorded by a near-end microphone B, and meanwhile the voice s(n) of a near-end speaker and the possible noise v(n) in the near-end environment may also be recorded by the near-end microphone, so as to generate the echoic audio data y(n).

Specifically, according to the simulated noisy data, as well as at least one of the pure speech audio data and the noise audio data, for example, the simulated noisy data, the simulated noisy data may be synthesized through the above formulas (1) to (8). The method for generating the near-end audio data of the simulated echo may be implemented through any one or more of the above formulas, e.g., formulas (9) to (13).

Operation 220: Perform convolution processing on the near-end audio data of the simulated echo and the room impulse response to generate near-end reverberation audio of the simulated echo.

Specifically, convolution is performed on the near-end audio data $\hat{y}(n)$ broadcast by the near-end loudspeaker and a randomly selected room impulse response signal RIR(n) to generate the near-end reverberation audio d(n) of the simulated echo, specifically as shown in a formula (15):

$$d(n) = \hat{y}(n) * RIR[n] = \sum_{k=-\infty}^{+\infty} \hat{y}[k]RIR[n-k]. \quad (15)$$

Operation 230: Generate the echoic audio data according to the near-end reverberation audio and the near-end audio data.

Specifically, the near-end audio data u(n) includes the voice s(n) of the near-end speaker and the possible noise v(n) in the near-end environment, and the near-end voice s(n) and the near-end possible noise v(n) may be synthesized according to a signal-to-noise ratio SNR synthesizing method to generate the near-end audio data u(n), which may be represented as a formula (16):

$$u(n)=s(n)+p*v(n) \quad (16);$$

where, a parameter p represents a noise adjusting ratio of noise audio when synthesizing the near-end audio data, and a calculating method may refer to the formulas (2) to (3), which will not be repeated here.

Further, the echoic audio data e(n) is generated according to the near-end audio data $\hat{y}(n)$ and the near-end audio data u(n), and the generation method may be represented as a formula (17):

$$e(n)=u(n)+q*d(n) \quad (17);$$

where, u(n) refers to the formula (16), d(n) refers to the formula (15), a parameter q represents an echo audio adjusting ratio when the echoic audio is synthesized according to a signal-to-echo ratio (SER), and the echoic audio data of different echo levels may be obtained by adjusting q.

In this way, the echoic audio data may be synthesized through the above formulas (1) to (17). At the same time, the echoic audio data in different application scenarios may further be synthesized through the above formulas (1) to (17), which at least may include the following scenarios:

(1) there is pure speech and no noise at the far end, and there is no pure speech at the near end;

(2) there is noisy speech at the far end, and there is no pure speech at the near end;

(3) there is no speech and no noise at the far end, and there is noisy speech at the near end;

(4) there is no speech and no noise at the far end, and there is pure speech at the near end;

(5) there is pure speech at the far end, and there is pure speech at the near end;

(6) there is pure speech at the far end, and there is noisy speech at the near end; and (7) there is noisy speech at the far end, and there is noisy speech at the near end.

For the scenario (1), there is someone speaking at the far end without noise, and the loudspeaker inputs the pure speech $x(n)=s(n)$. There is no pure speech at the near end, and then $u(n)=p*v(n)$ in the formula (16).

For the scenario (2), there is noisy speech at the far end, and the loudspeaker inputs the speech $x(n)=s(n)+\alpha n(n)$. There is no pure speech at the near end, and then $u(n)=p*v(n)$ in the formula (16).

For the scenario (3), there is noisy speech at the far end, and the loudspeaker inputs the speech $x(n)=s(n)+\alpha n(n)$. There is noisy speech at the near end, and then $u(n)=s(n)+p*v(n)$ in the formula (16).

Similarly, the echoic audio data of the above scenarios (1) to (7) and other echoic audio data of more application scenarios.

In this way, the echo phenomenon of speech entering the near-end microphone through the near-end loudspeaker and the near-end propagation environment may be simulated through the above formulas (1) to (17). Therefore, the changes in speech after spatial transmission generated by the echo are described through the mathematical form, so that various simulated echoic audio data is synthesized, and the need for manual preparation and collection of a large quantity of data and echoic audio data of various types of echo scenarios is eliminated. At the same time, the diversity of the echoic audio data is effectively improved.

In some embodiments, operation 230: generating the echoic audio data according to the near-end reverberation audio and the near-end audio data, includes:

performing delay processing on the near-end reverberation audio of the simulated echo to obtain reverberation audio recorded by a simulated near-end microphone; and processing the reverberation audio recorded by the simulated near-end microphone and the near-end audio data according to a signal-to-noise ratio to generate the echoic audio data.

Specifically, the near-end reverberation audio $d(n)$ of the simulated echo needs a certain delay time $t_{delay}$ to be broadcast from the near-end loudspeaker and recorded by the near-end microphone after being transmitted in the near-end environment, specifically as shown in a formula (18):

$$\hat{d}(n)=d(n-t_{delay}) \qquad (18);$$

where, $\hat{d}(n)$ represents reverberation audio recorded by the simulated near-end microphone after delay processing, $d(n)$ represents the near-end reverberation audio of the simulated echo, and $d(n)$ may refer to the formula (15).

Further, the reverberation audio recorded by the simulated near-end microphone and the near-end audio data are processed according to the signal-to-noise ratio to generate the echoic audio data. That is, the near-end audio data $u(n)$ of the signal and a reverberation signal $\hat{d}(n)$ recorded by the near-end microphone are synthesized according to a randomly selected SER, namely a parameter q, within a certain range to obtain the final echoic audio data $\hat{e}(n)$, specifically as shown in a formula (19);

$$\hat{e}(n)=u(n)+q*\hat{d}(n) \qquad (19);$$

where, the parameter q represents an echo audio scaling coefficient when synthesizing the echoic audio according to the SER, $t_{delay}$ represents time for transmitting the reverberation audio signal $d(n)$ in the near-end environment, and an appropriate value may be selected within a time range of 0-100 ms.

In a possible implementation, as for the target audio data, a speech enhance operation may further be performed to improve the diversity.

In some embodiments, operation 140: Execute a speech enhancement operation on the target audio data to obtain enhanced target audio data.

Speech enhancement may be further performed on the target audio data generated through the above formulas (1) to (19), such that more diversified enhanced target audio data is obtained based on the target audio data. The speech enhancement includes at least one first-order speech enhancement, and/or at least one high-order speech enhancement.

In some embodiments, the speech enhancement includes first-order speech enhancement, and operation 140 includes:

executing the first-order speech enhancement operation on the target audio data before inputting the target audio data into a speech model to obtain target audio data of first-order speech enhancement, where the first-order speech enhancement at least includes audio speed change, volume adjustment, random displacement, noise enhancement and multiplication enhancement.

The speech model includes task models that use various target audio data generated by the method for processing audio data in this application for related speech processing. It may be an AI machine learning model, or a non-AI machine learning model, such as a speech processing filter. The speech model may include an AI noise reduction model, an AI echo cancellation model, an AI speech recognition model, a speaker recognition model and the like.

The first-order speech enhancement operation is executed on the target audio data before inputting the target audio data into the speech model, and the first-order speech enhancement at least includes audio speed change, volume adjustment, random displacement, noise enhancement and multiplication enhancement.

The audio speed change may perform an acceleration or deceleration operation on the target audio data through randomly selecting a variable speed coefficient. For example, the target audio data $x(n)$ is originally inputted, the variable speed coefficient speed is randomly selected between a maximum variable speed value and a minimum variable speed value, and for the acceleration operation of speed>1, points may be taken at fixed intervals. The deceleration operation of speed<1 may be realized through first-order linear interpolation.

Volume enhancement may enhance and adjust the volume through exponential distribution calculation. For example, the target audio data x(n) is originally input, a volume gain range Uniform(min_dBFS, max_dBFS) is set, and a volume gain is calculated under exponential distribution, specifically as shown in a formula (20):

$$vol_{aug} = x(n) \cdot 10^{\left(\frac{\beta}{20}\right)} \tag{20}$$

$$\beta \in \text{Uniform(min\_dBFS, max\_dBFS)}.$$

The noise enhancement may randomly select a plurality of segments of noise data $noise_1(n)$, $noise_{2(n)}$, . . . , then superimpose the selected noise data at a time dimension.

The random displacement enhancement may be realized by randomly displacing the target audio data. For example, the target audio data x(n) is originally inputted, and the enhanced audio after random displacement may be represented as a formula (21):

$$shift_{aug}=x(n-t) \tag{21};$$

where, t represents an audio length of random displacement.

The multiplication enhancement may be used for simulating the possible fluctuation of speech levels during actual speaking. For example, the target audio data x(n) is inputted, and the target audio data x(n) is multiplied by a coefficient α, as shown in a formula (22):

$$aug_{x(n)}=x(n)\cdot\alpha \tag{22};$$

where, the coefficient α complies with normal distribution, such as $\alpha \in N(0,1)$.

In this way, before inputting the target audio data into the speech model, the first-order speech enhancement operation is executed on the target audio data to obtain the target audio data of first-order speech enhancement. In the first-order speech enhancement operation process, any above enhancement mode may be enhanced at least one time or multiple times, and a plurality of first-order speech enhancement modes may further be combined arbitrarily.

Through multi-step first-order audio data enhancement, nonlinear transformation is performed on the target audio data in the time domain, which may be represented as a formula (23):

$$y=F(x(n)) \tag{23};$$

where, F(x(n)) represents the enhanced target audio data obtained by combining the above first-order speech enhancement modes arbitrarily.

In this way, various types of first-order speech enhancement operations are performed on the target audio data, which may directly act on the original audio data, and basic and diverse types of audio data is generated in batches.

In some embodiments, the speech enhancement includes second-order speech enhancement, and operation 140: executing a speech enhancement operation on the target audio data to obtain enhanced target audio data, includes:

performing, in a data transmission process of the speech model, random information losing processing on the target audio data and/or the target audio data of first-order speech enhancement at a feature dimension in a time-frequency domain to obtain target audio data of second-order enhancement.

The speech model includes task models that use various audio data generated by the method for processing audio data in this application for related speech processing. It may be an AI machine learning model, or a non-AI machine learning model, such as a speech processing filter. The speech model may include an AI noise reduction model, an AI echo cancellation model, an AI speech recognition model, a speaker recognition model and the like.

Random information losing processing is performed on the target audio data, or the target audio data of first-order speech enhancement, or the target audio data and the target audio data of first-order speech enhancement at the feature dimension in the time-frequency domain. The following embodiments are explained using the target audio data as input.

Specifically, the second-order speech enhancement enhances feature dimensions such as a time-frequency map of the target audio data; in the transmission process of the speech model, two-dimensional target audio (B, T) is input, where B represents the quantity of audio samples, T represents a length of audio data; windowed speech signal processing may be performed on the two-dimensional target audio (B, T); and the two-dimensional target audio (B, T) is transformed into three-dimensional (B, T, C) time-frequency domain data for representation.

Further, time-frequency unit information of the three-dimensional audio time-frequency domain data is randomly lost, random information losing is performed in the time domain or the frequency domain, and a losing size may be a preset size. For the parts of random information losing of three-dimensional audio features, the lost information may be supplemented with 0.

Figure 4:
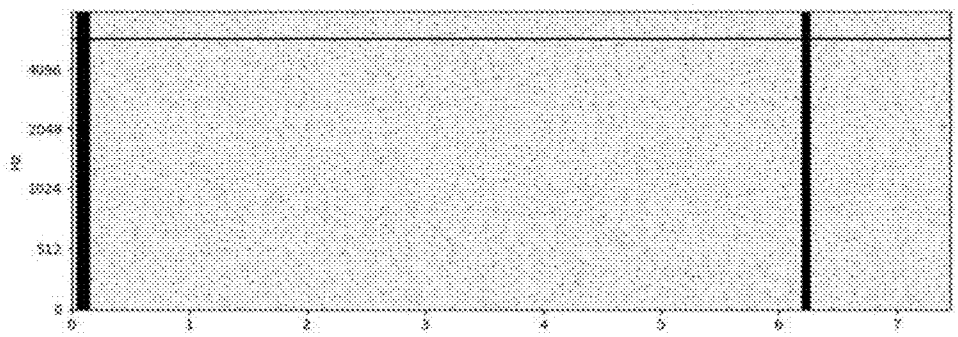
FIG. 4 is another example diagram of a method for processing audio data provided by an embodiment of this application.

Please refer to FIG. 4. FIG. 4 shows a schematic diagram of features of a random time-frequency unit after loss. The vertical black part represents randomly lost time domain information, and a horizontal black part represents randomly lost frequency domain information.

In some embodiments, the speech enhancement includes the high-order speech enhancement, and the operation of executing a speech enhancement operation on the target audio data to obtain enhanced target audio data, includes:

performing, in the transmission process of the speech model, random information losing processing on the target audio data of second-order enhancement at least one time at the feature dimension in the time-frequency domain to obtain target audio data of high-order enhancement.

Specifically, for the target audio data undergoing second-order speech enhancement in the model, multiple random information losing processing may be performed, so as to implement the high-order speech enhancement operation. That is, the high-order speech enhancement operation may include multiple speech enhancement operations, and in the speech model, it may include third-order speech enhancement, fourth-order speech enhancement . . . Nth-order speech enhancement.

The high-order speech enhancement may select enhancement order number according to an actual model structure or business needs. Each order of speech enhancement in the high-order speech enhancement is processed by random information losing, but parameters of each order, such as window function parameters of windowing, frequency domain loss and time domain loss may be determined according to the actual model structure or the business needs.

In some embodiments, the method for performing random information losing processing at the feature dimension in the time-frequency domain includes:

performing windowed frame shift processing on the target audio data to obtain corresponding three-dimensional audio data;

randomly losing data within a predetermined range of a time domain and/or a frequency domain of the three-dimensional audio data, such that data of the time domain and/or the frequency domain of the three-dimensional audio data is not successive; and determining the target audio data of high-order enhancement according to the randomly lost three-dimensional audio data.

Specifically, windowed frame shift processing may be performed on the target audio data through existing windowed types. The target audio data may include target audio data without speech enhancement, target audio data after first-order speech enhancement, or target audio data after second-order speech enhancement. The following is an exemplary situation that random information losing processing is performed on the target audio data.

For example, two-dimensional target audio data (B, T) is inputted into the speech model for analysis, B represents the quantity of audio samples, and T represents a length of audio data. The two-dimensional target audio data (B, T) is transformed into three-dimensional representation (B, T, C) through windowed frame shift processing. For example, windowed frame shift is performed on the target audio data (B, T)=(1, 16000), a frame length of 640 and a frame shift of 160 are taken, if the beginning and end of frame are not considered, the frame length of T=100 and C=640 may be obtained, and the three-dimensional audio is (1, 100, 640).

Further, the three-dimensional time-frequency domain feature of the three-dimensional audio (B, T, C) is represented as f(x, y, z), and a random losing process at a time dimension is represented as a formula (24):

$$f(x,y_1{:}y_1+\Delta y,z)=0 \quad (24);$$

where, a lose start point $y_1$ is randomly selected. A lose duration $\Delta y$ is randomly selected within a certain range, and a reference range may be (0-30).

A random losing process at a frequency dimension is represented as a formula (25):

$$f(x,y,z_1{:}z_1+\Delta z)=0 \quad (25);$$

where, a lose start point $z_1$ is randomly selected. A lose duration $\Delta z$ is randomly selected within a certain range, and a reference range may be (0-30).

If the speech model learns to extract features within a time domain range, random losing processing may be directly performed on three-dimensional (B, T, C) after windowed frame shift processing; and if the model learns to extract the features within a time-frequency domain, Fourier transform may be performed on the three-dimensional (B, T, C) after windowed frame shift, and then random losing processing is performed.

In some embodiments, global random losing of time-frequency information of a random area size may be performed on the three-dimensional audio data, and this process may be represented as a formula (26):

$$f(x,y_1{:}y_1+\Delta y,z_1{:}z_1+\Delta z)=0 \quad (26);$$

where, the representation of parameters $y_1$, $z_1$, $\Delta y$, $\Delta z$ is the same as that of formulas (24) and (25), which will not be repeated here.

In some embodiments, similarly, the two-dimensional audio data may be transformed into four-dimensional feature representation through windowing processing, and the random information losing operation in four-dimensional audio features may refer to the above formulas (24) to (26).

Through second-order speech enhancement, a possible feature losing situation in an actual data transmission process may be better simulated, it is equivalent to performing more complex expansion on the original audio data, and the diversity and the simulation of the target audio data are improved.

Figure 5:
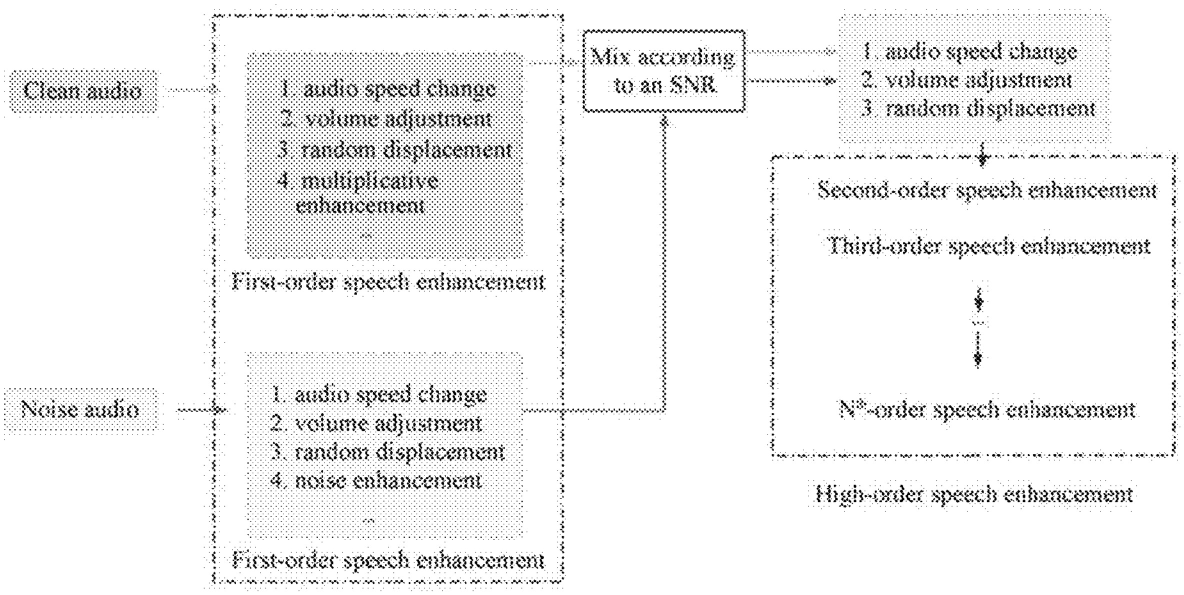
FIG. 5 is another example diagram of a method for processing audio data provided by an embodiment of this application.

Please refer to FIG. 5. FIG. 5 is an example flowchart of an embodiment of a speech enhancement operation, and first-order speech enhancement may be executed on the pure speech audio data and the noise audio data. Then, the pure speech audio data and noise audio data after first-order speech enhancement are mixed and superimposed according to the signal-to-noise ratio SNR, which may refer to the formulas (2) to (4).

Further, for the simulated noisy data after mixing and superimposing, the first-order speech enhancement may be performed on the pure speech audio data after first-order speech enhancement and the noise audio data after first-order speech enhancement again before inputting into the speech model.

After entering the speech model, in the speech model, the simulated noisy data after mixing and superimposing, the pure speech audio data after first-order speech enhancement and the noise audio data after first-order speech enhancement are subjected to second-order speech enhancement and multiple high-order enhancement operations, such as third-order speech enhancement . . . and Nth-order speech enhancement, so as to generate target audio data after second-order speech enhancement, target audio data after third-order speech enhancement . . . and target audio data after Nth-order speech enhancement.

In an example, the method for processing audio data of this application is adopted in an AI noise reduction model, so that key indicators of the AI noise reduction model in PESQ at different signal-to-noise ratios are all improved, and the indicators are detailed in the table below:

| Model | 0 dB | 5 dB | 10 dB | 15 dB |
|---|---|---|---|---|
| Original AI model | 2.226 | 2.595 | 3.012 | 3.299 |
| $N^{th}$-order speech enhancement + AI model | 2.274 | 2.728 | 3.114 | 3.420 |

The perceptual evaluation of speech quality (PESQ) is an objective and fully referenced speech quality evaluation method. Its algorithm needs a noisy attenuated signal and an original reference signal, which can provide a subjective prediction value for objective speech quality evaluation, the score is between −0.5 and 4.5, and the higher the score, the better the speech quality. From the above experimental results, it may be seen that processing effects of the AI noise reduction model after applying its own method for processing audio data at different signal-to-noise ratios are all improved. In the table, the model use signal-to-noise ratios of 0 dB, 5 dB, 10 dB and 15 dB respectively, the "original AI model" is a PESQ value without using a high-order speech enhancement method, and the "$N^{th}$-order speech enhancement+AI model" is a PESQ value using $N^{th}$-order speech enhancement in the AI model.

In this way, compared to the first-order audio enhancement method that directly acts on the original target audio data, in the model, random losing is performed on the audio data at the feature dimension in the time-frequency domain. On the one hand, random losing may be controlled through model parameters, which is closely related to the actual needed speech processing services, and corresponding random losing effects are executed according to different speech processing services. On the other hand, the diversity of speech inputted by the model may be effectively improved, avoiding the problem of the model overly relying on a complete contextual relationship of the audio if the inputted models are all complete and not losing information. When information is randomly lost, the model may be forced to focus on the relationship between audio that is slightly far from each other, more information is learnt from the data, and the performance of the model is improved. At the same time, the simultaneous enhancement operation of first-order and high-order, as well as a higher-order data enhancement strategy further improve the diversity of a dataset, the generalization ability of the model is improved, and more complex expansion is performed on the original target audio data.

An optional embodiment of this application may be formed by using any combination of all the foregoing optional technical methods, and details are not described one by one herein.

In some embodiments, a simulated audio dataset is established according to at least one of the pure speech audio data, the noise audio data, the simulated noisy data and the target audio data.

Specifically, the simulated audio dataset is established according to the simulated noisy data and the target audio data generated in any of the above embodiments, as well as the target audio data after speech enhancement. In some embodiments, the simulated audio dataset may be established, and contains the simulated noisy data and the target audio data obtained in any of the above embodiments, and the collected original audio data, including the pure speech audio data, the noise audio data and the like.

Figure 6:
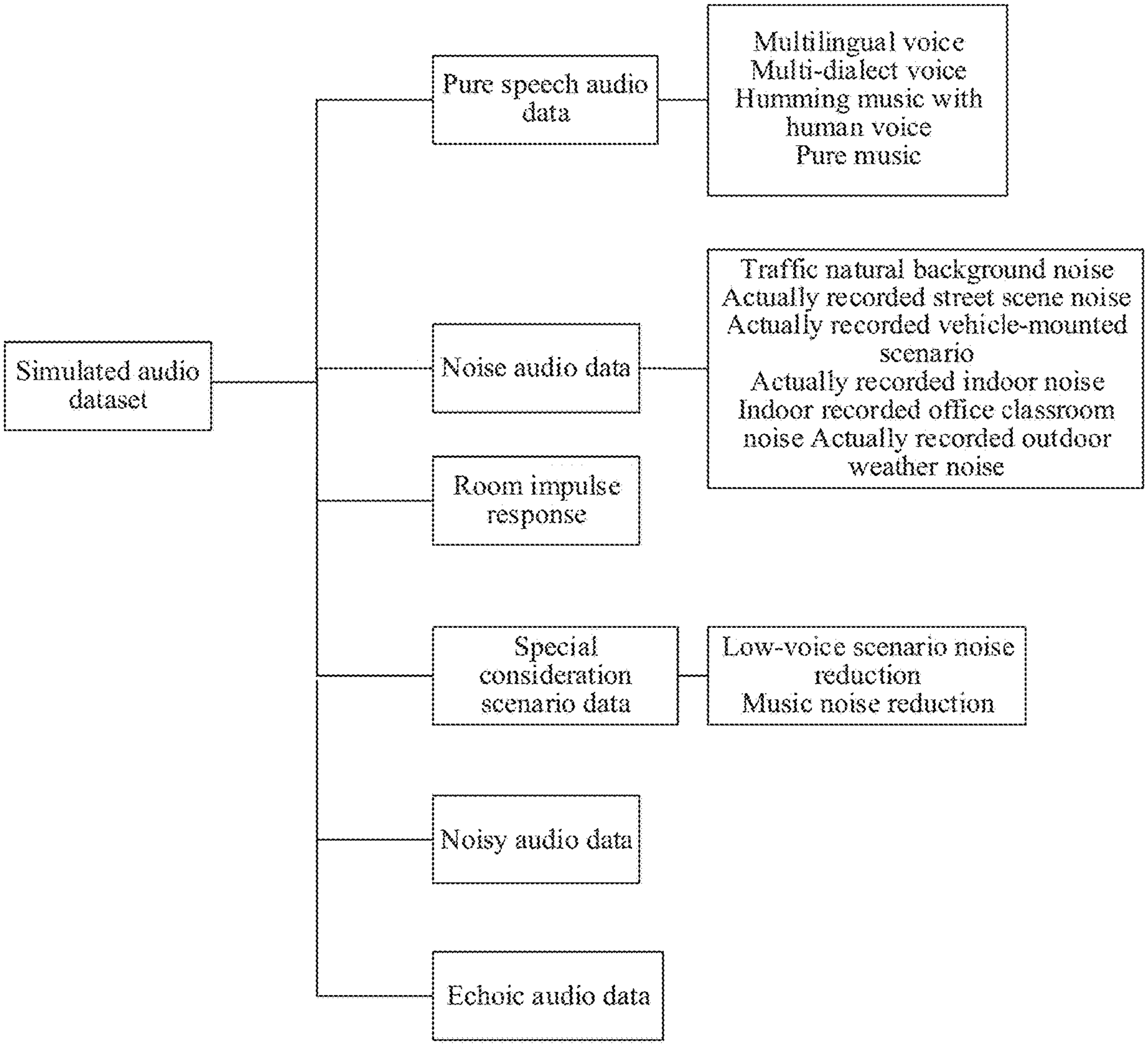
FIG. 6 is another example diagram of a method for processing audio data provided by an embodiment of this application.

Please refer to FIG. 6, and FIG. 6 is an example of establishment of a simulated audio dataset. The simulated audio dataset includes the collected pure speech audio data and noise audio data, a room impulse response and data for special consideration scenarios, including whispered audio collected for low-voice scenario noise reduction, and pure music audio data collected for music noise reduction. At the same time, the noisy audio data and echoic audio data synthesized according to the pure speech audio data, the noise audio data, the room impulse response and the data for special consideration scenarios may be used as a simulated audio dataset for storage. In some embodiments, synthesis may be performed in real time during actual service applications.

When audio data in the simulated audio dataset needs to be used for audio processing services, speech processing may be performed based on the data in the simulated audio dataset, and the high-order speech enhancement operation is performed in a speech processing process, so as to complete the corresponding speech processing tasks.

According to the embodiments of this application, the collected original audio data is obtained, including the pure speech audio data and the noise audio data; the simulated noisy data is generated according to the pure speech audio data and the noise audio data in the original audio data; the target audio data used for simulating changes in audio after spatial transmission is generated according to the original audio data or the simulated noisy data; and the speech enhancement operation is executed on the target audio data to obtain enhanced target audio data. A large quantity of easily available clean human voice audio and a variety of noise audio are adopted, changes of speech in a spatial propagation path are described through a mathematical language, and various simulated target audio data is synthesized. Compared to existing manual collection of audio data, where a large quantity of manpower and resources may be consumed, in this application, the original audio data which is easily collected is used for audio data processing, the changes of audio through various spatial transmission are simulated through the mathematical language to automatically generate diversified target audio data in batches, and a more comprehensive simulated audio data synthesizing method is provided. In addition, the speech enhancement operation is provided for the generated target audio data, and the diversity of the dataset is further improved.

In addition, compared to an existing data enhancement technology that contains more data enhancement operations, the speech enhancement operation of this application effectively improves the diversity of the dataset through a multi-order speech enhancement operation containing at least one first-order and high-order operations. At the same time, for the speech processing tasks based on the AI model such as noise reduction and echo cancellation, a high-order speech enhancement method is provided, on the basis of first-order ordinary audio data enhancement, it is inputted into the model, and a high-order enhancement operation is added into the model, which expands the diversity of audio data, and improves the generalization ability of the speech model to a certain extent.

Furthermore, under the background of AI speech noise reduction and echo cancellation, this application may establish the simulated audio dataset according to at least one of the generated pure speech audio data, the noise audio data, the simulated noisy data and the target audio data, and may perform speech processing based on the data in the simulated audio dataset to complete the corresponding speech tasks. At the same time, the original audio data can be efficiently utilized, a data collection cost is effectively reduced, a data utilization rate is maximized, and the performance of the AI speech model in downstream tasks is improved.

Figure 7:
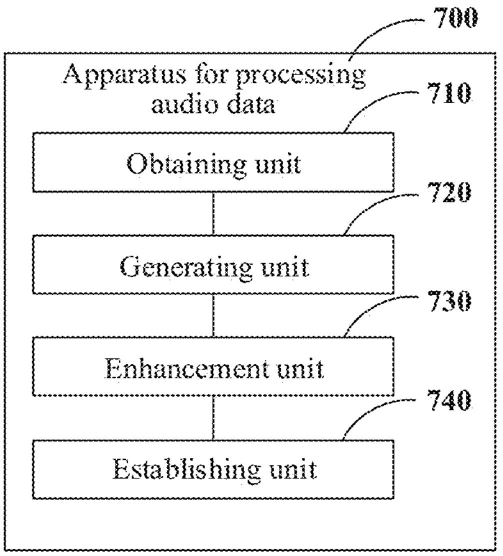
FIG. 7 is a schematic structural diagram of an apparatus for processing audio data provided by an embodiment of this application.

In order to better implement the method for processing audio data of this embodiment of this application, an embodiment of this application further provides an apparatus for processing audio data. Please refer to FIG. 7, and FIG. 7 is a schematic structural diagram of an apparatus for processing audio data provided by an embodiment of this application. The apparatus 700 for processing audio data may include:

an obtaining unit 710, configured to obtain collected original audio data, the original audio data including pure speech audio data and noise audio data; and a generating unit 720, configured to generate simulated noisy data according to the pure speech audio data and the noise audio data in the original audio data, and generate the target audio data used for simulating changes in audio after spatial transmission according to the simulated noisy data.

In some embodiments, an enhancement unit 730 is further included and configured to execute a speech enhancement operation on the target audio data to obtain enhanced target audio data.

In some embodiments, the generating unit 720 may be configured to transform multiplicative noise audio data in the noise audio data into additive noise audio data through homomorphic filtering processing; and synthesize the pure speech audio data and the additive noise audio data according to a signal-to-noise ratio to obtain the simulated noisy audio data.

In some embodiments, the generating unit 720 may further be configured to generate simulated loudspeaker audio used for simulating changes in audio passing through a loudspeaker according to the simulated noisy data, as well as at least one of the pure speech audio data and the noise audio data; and generate the reverberation audio data according to the simulated loudspeaker audio and a room impulse response.

In some embodiments, the generating unit 720 may further be configured to process the simulated noisy data, the pure speech audio data and the noise audio data as a loudspeaker input signal to obtain an audio signal maximum value; generate loudspeaker power amplifier audio used for simulating changes in audio passing through a power amplifier saturation zone in the loudspeaker according to the audio signal maximum value and the loudspeaker input signal; perform first nonlinear conversion on the loudspeaker power amplifier audio to obtain nonlinear loudspeaker power amplifier audio; and process the nonlinear loudspeaker power amplifier audio by using the nonlinear action function to generate the simulated loudspeaker audio.

In some embodiments, the generating unit 720 may further be configured to generate near-end audio data of a simulated echo according to the simulated noisy data, as well as at least one of the pure speech audio data and the noise audio data; perform convolution processing on the near-end audio data of the simulated echo and the room impulse response to generate near-end reverberation audio of the simulated echo; and generate the echoic audio data according to the near-end reverberation audio and the near-end audio data.

In some embodiments, the generating unit 720 may further be configured to perform delay processing on the near-end reverberation audio of the simulated echo to obtain reverberation audio recorded by a simulated near-end microphone; and process the reverberation audio recorded by the simulated near-end microphone and the near-end audio data according to the signal-to-noise ratio to generate the echoic audio data.

In some embodiments, the enhancement unit 730 may be configured to execute first-order speech enhancement operation on the audio data before inputting the target audio data into a speech model to obtain target audio data of first-order speech enhancement, where the first-order speech enhancement at least includes audio speed change, volume adjustment, random displacement, noise enhancement and multiplication enhancement.

In some embodiments, the enhancement unit 730 may be configured to perform, in a data transmission process of the speech model, random information losing processing on the target audio data and/or target audio data of first-order speech enhancement at a feature dimension in a time-frequency domain to obtain target audio data of second-order enhancement.

In some embodiments, the enhancement unit 730 may be configured to perform, in the data transmission process of the speech model, random information losing processing on the target audio data of second-order enhancement at least one time at the feature dimension in the time-frequency domain to obtain target audio data of high-order enhancement.

In some embodiments, the enhancement unit 730 may be configured to perform windowed frame shift processing on the target audio data of second-order enhancement to obtain corresponding three-dimensional audio data; randomly lose data within a predetermined range of a time domain and/or a frequency domain of the three-dimensional audio data, such that data of the time domain and/or the frequency domain of the three-dimensional audio data is not successive; and determine the target audio data of high-order enhancement according to the randomly lost three-dimensional audio data.

In some embodiments, the apparatus 700 for processing audio data further includes an establishing unit 740, and the establishing unit 740 may be configured to establish a simulated audio dataset according to at least one of the pure speech audio data, the noise audio data, the simulated noisy data and target audio data; and perform speech processing based on data in the simulated audio dataset to complete a corresponding speech task.

The functions of the modules in the apparatus 700 for processing audio data in this embodiment of this application may refer to a specific implementation of any embodiment in the foregoing method embodiments, which will not be repeated here.

Units in the above apparatus 700 for processing audio data may be all or partially implemented through software, hardware and a combination thereof. All the units above may be embedded in or independent of a processor in a computer device in a hardware form, or stored in a memory in the computer device in a software form, so as to facilitate the processor to call and execute corresponding operations of the above all units.

The apparatus 700 for processing audio data may be integrated, for example, in a terminal or server with a memory and installed with a processor, which has computing power, or the apparatus 700 for processing audio data is the terminal or server. The terminal may be a smart phone, a tablet, a laptop, a smart TV, a smart speaker, a wearable smart device, a personal computer (PC) and other devices, the terminal may further include a client, and the client may be a video client, a browser client, or an instant messaging client. The server may be an independent physical service, or may be a server cluster or distributed system composed of a plurality of physical servers, or may be a cloud server that provides cloud services, a cloud database, cloud computing, cloud functions, cloud storage, network services, cloud communication, middleware services, domain name services, security services, a content delivery network (CDN), a big data and artificial intelligence platform and other basic cloud computing services.

Figure 8:
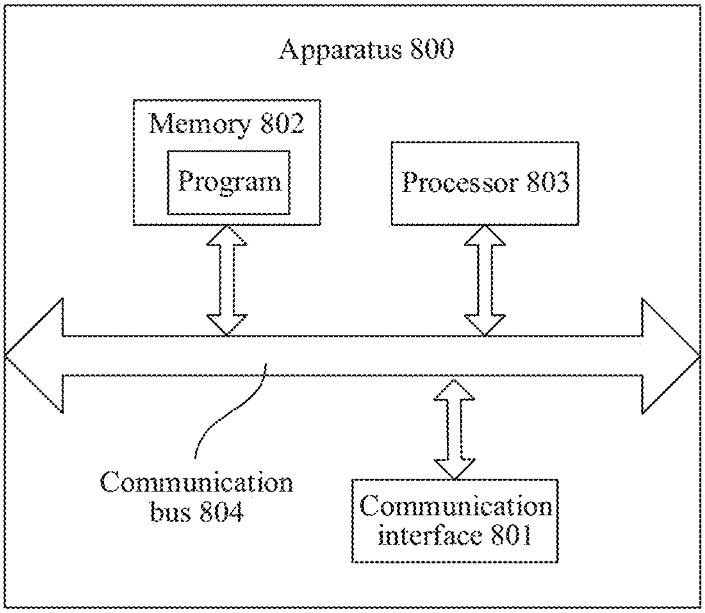
FIG. 8 is another schematic structural diagram of an apparatus for processing audio data provided by an embodiment of this application.

FIG. 8 is a schematic structural diagram of an apparatus 800 for processing audio data provided by an embodiment of this application. As shown in FIG. 8, the apparatus 800 for processing audio data may include: a communication interface 801, a memory 802, a processor 803, and a communication bus 804. The communication interface 801, the memory 802, and the processor 803 communication with one another through the communication bus 804. The communication interface 801 is configured for the apparatus 800 to perform data communication with an external device. The memory 802 may be configured to store a software program and module, and the processor 803 runs the software program and module stored in the memory 802, such as software programs of corresponding operations in the foregoing method embodiments.

In some embodiments, the processor 803 may call the software program and module stored in the memory 802 to execute the following operations:

obtaining collected original audio data, the original audio data including pure speech audio data and noise audio data;

generating the simulated noisy data according to the pure speech audio data and the noise audio data in the original audio data; and generating the target audio data used for simulating changes in audio after spatial transmission according to the simulated noisy data.

In some embodiments, the apparatus 800 for processing audio data may be integrated, for example, in a terminal or server with a memory and installed with a processor, which has computing power, or the apparatus 800 for processing audio data is the terminal or server. The terminal may be a smart phone, a tablet, a laptop, a smart TV, a smart speaker, a wearable smart device, a personal computer and other devices. The server may be an independent physical service, or may be a server cluster or distributed system composed of a plurality of physical servers, or may be a cloud server that provides cloud services, a cloud database, cloud computing, cloud functions, cloud storage, network services, cloud communication, middleware services, domain name services, security services, a CDN, a big data and artificial intelligence platform and other basic cloud computing services.

In some embodiments, an embodiment of this application further provides a computer device, including a memory and a processor, the memory storing in a computer program, and the processor, when executing the computer program, implementing operations in the above method embodiments.

This application further provides a computer-readable storage medium, configured to store a computer program. The computer-readable storage medium may be applied to a computer device, and the computer program enables the computer device to execute corresponding flows in the above method in this embodiment of this application. For simplicity, it will not be repeated here.

This application further provides a computer program product, the computer program product including computer instructions, and the computer instructions being stored in a computer-readable storage medium. A processor of a computer device reads the computer instructions from the computer-readable storage medium, and the processor executes the computer instructions to enable the computer device to execute corresponding flows in the above method in this embodiment of this application. For simplicity, it will not be repeated here.

This application further provides a computer program, the computer program including computer instructions, and the computer instructions being stored in a computer-readable storage medium. A processor of a computer device reads the computer instructions from the computer-readable storage medium, and the processor executes the computer instructions to enable the computer device to execute corresponding flows in the above method in this embodiment of this application. For simplicity, it will not be repeated here.

It is to be understood that the processor in this embodiment of this application may be an integrated circuit chip, and has a signal processing capability. In an implementation process, operations of the above method embodiments may be implemented by using a hardware integrated logic circuit in the processor or instructions in a form of software. The methods, the operations, and logic block diagrams that are disclosed in the embodiments of this application may be implemented. A general-purpose processor may be a microprocessor, or the processor may be any conventional processor or the like. The operations of the method disclosed with reference to the embodiments of this application may be directly performed and completed by using a hardware decoding processor, or may be executed and completed by using a combination of hardware and software modules in the decoding processor. The software module may be stored in a storage medium that is mature in the art, such as a random access memory, a flash memory, a read-only memory, a programmable read-only memory, an electrically erasable programmable memory, or a register. The storage medium is located in the memory. The processor reads information in the memory and completes the operations of the above methods in combination with hardware thereof.

It may be understood that the memory in this embodiment of this application may be a volatile memory or a non-volatile memory, or may include both the volatile memory and the non-volatile memory.

A person of ordinary skill in the art may notice that the exemplary units and algorithm operations described with reference to the embodiments disclosed in this specification can be implemented in electronic hardware, or a combination of computer software and electronic hardware. Whether the functions are executed in a mode of hardware or software depends on particular applications and design constraint conditions of the technical methods. A person skilled in the art may use different methods to implement the described functions for each particular application, but it is not to be considered that the implementation goes beyond the scope of this application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it is to be understood that the disclosed system, apparatus, and method may be implemented in other manners. For example, the apparatus embodiment described above is only illustrative. For example, the division of the units is only a logical function division. In actual implementation, there may be other division methods, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units and may be electrical, mechanical or in other forms.

The units described as separate components may or may not be physically separated, and the components displayed as units may or may not be physical units, and may be located in one place or may be distributed on a plurality of network units. Some or all of the units may be selected according to actual needs to realize the objectives of the method of the embodiments.

In addition, functional units in the embodiments of this application may be integrated into one processing unit, or each of the units may be physically separated, or two or more units may be integrated into one unit.

If implemented in the form of software functional units and sold or used as an independent product, the functions may also be stored in a computer-readable storage medium. Based on such an understanding, the technical methods of this application essentially, or the part contributing to the related technology, or all or some of the technical solutions may be implemented in the form of a software product. The computer software product is stored in a storage medium and includes a plurality of instructions for enabling a computer device (which may be a personal computer and a server) to execute all or some of the operations of the methods described in the embodiments of this application. The foregoing storage medium includes various media that may store processing codes, such as a USB flash disk, a removable hard disk, an ROM, an RAM, a magnetic disk, or an optical disc.

The foregoing description is only a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing noise reduction and echo cancellation in audio data, executed by a computer device and comprising:

obtaining original audio data, the original audio data including pure speech audio data and noise audio data;

transforming multiplicative noise audio data in the noise audio data into additive noise audio data based on homomorphic filtering;

generating simulated noisy data based on the pure speech audio data and the additive noise audio data; and generating target audio data based on the simulated noisy data, the target audio data being used for simulating changes in the original audio data after spatial transmission.

2. The method according to claim 1, wherein generating the simulated noisy data comprises:

synthesizing the pure speech audio data and the additive noise audio data based on a signal-to-noise ratio, to generate the simulated noisy data.

3. The method according to claim 1, wherein the target audio data comprises reverberation audio data, and wherein generating the target audio data comprises:

generating simulated loudspeaker audio based on the simulated noisy data and at least one of the pure speech audio data and the noise audio data, wherein the simulated loudspeaker audio is used for simulating changes in audio passing through a loudspeaker; and generating the reverberation audio data based on the simulated loudspeaker audio and a room impulse response.

4. The method according to claim 3, wherein generating the simulated loudspeaker audio comprises:

obtaining an audio signal maximum value based on the simulated noisy data, the pure speech audio data and the noise audio data as a loudspeaker input signal;

generating loudspeaker power amplifier audio based on the audio signal maximum value and the loudspeaker input signal, wherein the loudspeaker power amplifier audio is used for simulating changes in audio passing through a power amplifier saturation zone in the loudspeaker;

obtaining nonlinear loudspeaker power amplifier audio based on a first nonlinear conversion of the loudspeaker power amplifier audio; and generating the simulated loudspeaker audio based on the nonlinear loudspeaker power amplifier audio by using a nonlinear action function.

5. The method according to claim 1, wherein the target audio data comprises echoic audio data, and wherein generating the target audio data comprises:

generating near-end audio data of a simulated echo based on the simulated noisy data and at least one of the pure speech audio data and the noise audio data;

generating near-end reverberation audio of the simulated echo based on performing convolution processing on the near-end audio data and a room impulse response; and generating the echoic audio data based on the near-end reverberation audio and the near-end audio data.

6. The method according to claim 5, wherein generating the echoic audio data comprises:

obtaining reverberation audio recorded by a simulated near-end microphone based on delay processing on the near-end reverberation audio of the simulated echo; and generating the echoic audio data based on the reverberation audio recorded by the simulated near-end microphone and the near-end audio data according to a signal-to-noise ratio to generate the echoic audio data.

7. The method according to claim 1, further comprising:

obtaining enhanced target audio data by executing a speech enhancement operation on the target audio data.

8. The method according to claim 7, wherein the speech enhancement processing comprises first-order speech enhancement, wherein the first-order speech enhancement comprises at least one of an audio speed change, a volume adjustment, a random displacement, a noise enhancement and a multiplication enhancement, and wherein obtaining the enhanced target audio data comprises:

executing the first-order speech enhancement on the target audio data; and obtaining target audio data of the first-order speech enhancement by inputting the target audio data into a speech model.

9. The method according to claim 8, wherein the speech enhancement further comprises second-order speech enhancement, and wherein obtaining the enhanced target audio data further comprises:

obtaining target audio data of the second-order enhancement based on random information losing processing being performed on the target audio data or the target audio data of the first-order speech enhancement, wherein the random information losing processing is performed during a data transmission process of the speech model at a feature dimension in a time-frequency domain.

10. The method according to claim 9, wherein the speech enhancement further comprises high-order speech enhancement, and the method further comprises:

obtaining target audio data of the high-order enhancement based on the random information losing processing on the target audio data of second-order enhancement, wherein the random information losing processing on the target audio data of second-order enhancement is performed during the data transmission process of the speech model at least one time in the feature dimension in the time-frequency domain.

11. The method according to claim 10, wherein performing the random information losing processing comprises:

obtaining three-dimensional audio data corresponding to the target audio data of the second-order enhancement based on windowed frame shift processing the target audio data of the second-order speech enhancement;

randomly replacing three-dimensional audio data within a first predetermined range of a time domain of the three-dimensional audio data or a second predetermined range of a frequency domain of the three-dimensional audio data, wherein data of the time domain of the three-dimensional audio data or data of the frequency domain of the three-dimensional audio data is not successive; and determining the target audio data of high-order enhancement based on the randomly lost three-dimensional audio data.

12. The method according to claim 1, comprising:

establishing a simulated audio dataset according to at least one of the pure speech audio data, the noise audio data, the simulated noisy data and the target audio data; and performing speech processing based on data in the simulated audio dataset.

13. An apparatus for noise reduction and echo cancellation in audio data for, the apparatus comprising:

at least one memory configured to store computer program code; and at least one processor configured to access the at least one memory and operate according to the computer program code, the computer program code comprising:

first obtaining code configured to cause the at least one processor to obtain original audio data, the original audio data including pure speech audio data and noise audio data;

transforming code configured to cause the at least one processor to transform multiplicative noise audio data in the noise audio data into additive noise audio data based on homomorphic filtering;

first generating code configured to cause the at least one processor to generate simulated noisy data based on the pure speech audio data and the additive noise audio data; and second generating code configured to cause the at least one processor to generate target audio data based on the simulated noisy data, the target audio data being used for simulating changes in the original audio data after spatial transmission.

14. The apparatus of claim 13, wherein the first generating code comprises:

second obtaining code configured to cause the at least one processor to synthesize the pure speech audio data and the additive noise audio data based on a signal-to-noise ratio to generate the simulated noisy data.

15. The apparatus of claim 13, wherein the target audio data comprises reverberation audio data, and wherein the second generating code comprises:

third generating code configured to cause the at least one processor to generate simulated loudspeaker audio based on the simulated noisy data and at least one of the pure speech audio data and the noise audio data, wherein the simulated loudspeaker audio is used for simulating changes in audio passing through a loudspeaker; and fourth generating code configured to cause the at least one processor to generate the reverberation audio data based on the simulated loudspeaker audio and a room impulse response.

16. The apparatus of claim 15, wherein the third generating code comprises:

third obtaining code configured to cause the at least one processor to obtain an audio signal maximum value based on the simulated noisy data, the pure speech audio data and the noise audio data as a loudspeaker input signal;

fifth generating code configured to cause the at least one processor to generate loudspeaker power amplifier audio based on the audio signal maximum value and the loudspeaker input signal, wherein the loudspeaker power amplifier audio is used for simulating changes in audio passing through a power amplifier saturation zone in the loudspeaker;

fourth obtaining code configured to cause the at least one processor to obtain nonlinear loudspeaker power amplifier audio based on a first nonlinear conversion of the loudspeaker power amplifier audio; and sixth generating code configured to cause the at least one processor to generate the simulated loudspeaker audio based on the nonlinear loudspeaker power amplifier audio by using a nonlinear action function.

17. The apparatus of claim 13, wherein the target audio data comprises echoic audio data, and wherein the second generating code comprises:

seventh generating code configured to cause the at least one processor to generate near-end audio data of a simulated echo based on the simulated noisy data and at least one of the pure speech audio data and the noise audio data;

eighth generating code configured to cause the at least one processor to generate near-end reverberation audio of the simulated echo based on a convolution processing on the near-end audio data and a room impulse response; and ninth generating code configured to cause the at least one processor to generate the echoic audio data based on the near-end reverberation audio and the near-end audio data.

18. The apparatus of claim 17, wherein the ninth generating code comprises:

fifth obtaining code configured to cause the at least one processor to obtain reverberation audio recorded by a simulated near-end microphone based on delay processing on the near-end reverberation audio of the simulated echo; and tenth generating code configured to cause the at least one processor to generate the echoic audio data based on the reverberation audio recorded by the simulated near-end microphone and the near-end audio data according to a signal-to-noise ratio to generate the echoic audio data.

19. A non-transitory computer-readable medium storing a program which, when executed by at least one processor, causes the at least one processor to at least:

obtain original audio data, the original audio data including pure speech audio data and noise audio data;

transforming multiplicative noise audio data in the noise audio data into additive noise audio data based on homomorphic filtering, generate simulated noisy data based on the pure speech audio data and the additive noise audio data; and generate target audio data based on the simulated noisy data, the target audio data being used for simulating changes in the original audio data after spatial transmission.

20. The non-transitory computer-readable medium of claim 19, wherein the simulated noisy data is generated by at least:

obtaining the simulated noisy data by synthesizing the pure speech audio data and the additive noise audio data based on a signal-to-noise ratio.

* * * * *